(12) United States Patent
Ardo et al.

(10) Patent No.: US 9,049,347 B2
(45) Date of Patent: Jun. 2, 2015

(54) METHOD AND MOBILE UNIT FOR FACILITATING INSTALLATION OF A SURVEILLANCE CAMERA

(71) Applicant: Axis AB, Lund (SE)

(72) Inventors: Bjorn Ardo, Lund (SE); Johan Nystrom, Vellinge (SE)

(73) Assignee: AXIS AB, Lund (SE)

( * ) Notice: Subject to any disclaimer, the term of this patent is extended or adjusted under 35 U.S.C. 154(b) by 54 days.

(21) Appl. No.: 13/728,321

(22) Filed: Dec. 27, 2012

(65) Prior Publication Data

US 2013/0169803 A1 Jul. 4, 2013

Related U.S. Application Data

(60) Provisional application No. 61/581,388, filed on Dec. 29, 2011.

(30) Foreign Application Priority Data

Dec. 29, 2011 (EP) ..................................... 11196056

(51) Int. Cl.
*H04N 7/18* (2006.01)
*G08B 13/196* (2006.01)
*H04N 5/232* (2006.01)
*H04N 17/00* (2006.01)

(52) U.S. Cl.
CPC .............. *H04N 7/18* (2013.01); *G08B 13/1968* (2013.01); *H04N 5/23296* (2013.01); *H04N 7/183* (2013.01); *H04N 5/23216* (2013.01); *H04N 17/002* (2013.01)

(58) Field of Classification Search
USPC ........................................................ 348/143
See application file for complete search history.

(56) References Cited

U.S. PATENT DOCUMENTS

| | | | |
|---|---|---|---|
| 4,527,201 A | 7/1985 | Cappels | |
| 2005/0024504 A1* | 2/2005 | Hoshi | 348/231.3 |
| 2005/0031326 A1* | 2/2005 | Yamazaki | 396/55 |
| 2006/0153554 A1* | 7/2006 | Misawa et al. | 396/55 |
| 2007/0040913 A1* | 2/2007 | Fisher et al. | 348/218.1 |
| 2008/0218600 A1* | 9/2008 | Grosso et al. | 348/231.6 |
| 2009/0010493 A1* | 1/2009 | Gornick et al. | 382/103 |
| 2009/0102920 A1 | 4/2009 | Yamanaka | |
| 2011/0109772 A1* | 5/2011 | Ejima et al. | 348/240.99 |
| 2011/0141144 A1* | 6/2011 | Tomono | 345/660 |
| 2011/0243538 A1* | 10/2011 | Morimoto | 396/77 |
| 2012/0062693 A1* | 3/2012 | Hada | 348/36 |
| 2012/0169914 A1* | 7/2012 | Kim et al. | 348/333.12 |

FOREIGN PATENT DOCUMENTS

EP   1641247 A2   3/2006

\* cited by examiner

*Primary Examiner* — Dave Czekaj
*Assistant Examiner* — Mohammad J Rahman
(74) *Attorney, Agent, or Firm* — Volpe and Koenig, P.C.

(57) ABSTRACT

A method and mobile unit facilitate installation of a surveillance camera for monitoring an object of interest in a scene. The surveillance camera acquires a zoomed out image of the scene. The zoomed out image is displayed in a display wherein the zoomed out image has a zoomed out center point. An indicator overlaid on the displayed zoomed out image is displayed in the display, wherein the indicator and the zoomed out center point are displaced in relation to each other by a deviation. The indicator indicates the position of a zoomed in center point of a zoomed in image of the scene. The surveillance camera is directed so that the position of the object of interest and the indicator coincide so that the object of interest is included in a zoomed in image of the scene.

20 Claims, 5 Drawing Sheets

METHOD AND MOBILE UNIT FOR FACILITATING INSTALLATION OF A SURVEILLANCE CAMERA

CROSS REFERENCE TO RELATED APPLICATIONS

This application claims the benefit of U.S. Provisional Patent Application No. 61/581,388 filed Dec. 29, 2011 and EP No. 11196056.3 filed Dec. 29, 2011, which are incorporated by reference as if fully set forth.

TECHNICAL FIELD

The present invention relates to a method and mobile unit for facilitating installation of a surveillance camera for monitoring an object of interest in a scene and to such a surveillance camera facilitating installation of the same.

BACKGROUND ART

A camera having a zooming capability is able to acquire zoomed in and zoomed out images. Upon zooming in, the camera is directed so that it is centered on the object to be zoomed in and hopefully, upon zooming in, the object to be zoomed in is displayed zoomed in, in the zoomed in camera view.

U.S. Pat. No. 4,527,201 relates to a zoom indicating apparatus for a video zoom camera that provides a viewfinder raster display of a scene within the field of view of the camera superimposes upon the raster display a zoom frame that indicates the portion of the scene that would be within the field of view of the camera at its maximum zoom setting. The apparatus converts a zoom setting signal from the camera to a signal corresponding to the magnification at that zoom setting, employs the magnification signal for generating zoom frame signals which define the size and location of the zoom frame on the display, and combines the zoom frame signals with the video signal from the camera to form a composite video signal that is applied to the display. The apparatus automatically adjusts the position of the zoom frame on the display so as to compensate for misalignment between the optical axis of the camera lens and the center of the scanned image on the camera sensor tubes.

US 2009/0102920 relates to an optical apparatus that includes a zoom lens unit, a pan/tilt unit configured to at least one of pan the zoom lens unit and tilt the zoom lens unit, and a center-shift information storage portion configured to store a shift amount of an optical axis for every zooming position, and has a mechanism configured to correct a shift of the optical axis caused by zooming, by driving the pan/tilt unit by the shift amount of the optical axis stored in the center-shift information storage portion.

Unfortunately, cameras having high zooming capability can be associated with problems when zooming in. Due to mechanical deviations in the camera, the object to be zoomed in, i.e. the object centered in a zoomed out view, may not even be visible in the zoomed in view. This is illustrated by an example in FIGS. 1a and b each comprising a camera view. FIG. 1a displays a zoomed out camera view comprising two houses 10 and 20. The camera is centered on house 10, more specifically on the circular window arranged in the roof. Upon zooming in, however, due to mechanical deviations in the camera, the zoomed in view does not display the circular window and not even the house 10. Instead, the zoomed in view, illustrated by FIG. 1b, displays the house 20. One way to solve this problem would be to zoom in the camera, redirect it towards the circular window and then zoom the camera out again. This is however time-consuming. It is particularly time-consuming for surveillance cameras that are not panned nor tilted during use after installation.

Thus, it is apparent that surveillance cameras having high zooming capability are associated with problems.

SUMMARY OF THE INVENTION

A method is disclosed for facilitating installation of a surveillance camera for monitoring an object of interest in a scene. The method comprises: the surveillance camera acquiring a zoomed out image of the scene, wherein the zoomed out image has a zoomed out center point; overlaying an indicator on the displayed zoomed out image; displaying, in a display, the zoomed out image and the overlaid indicator, wherein a center of the indicator and the zoomed out center point are displaced in relation to each other by a deviation; the indicator indicating the position of a zoomed in image of the scene, thus enabling directing the surveillance camera so that the position of the object of interest and the indicator coincide so that the object of interest is included in a zoomed in image of the scene.

This is advantageous in that the installation of the surveillance camera is facilitated. The person performing the installation does not need to use the zoom of the camera to be sure that the camera is properly directed. This also results in that the installation of the surveillance camera is quicker. It is particularly advantageous for surveillance cameras that are not panned nor tilted during use after installation.

The deviation may be stored in a non-volatile memory in the surveillance camera. This is advantageous since the deviation can be measured during assembly (or later) and then be stored in the camera instead of storing the deviation in an external database which is much more cumbersome.

The indicator may be at least one from a dot, a point, a star, a cross, or a geometric shape such as a circle, ellipse, square, rectangle, triangle, or other type of polygon, or a combination thereof. Any graphical indicator that draws the attention of the person performing the installation is possible. This is advantageous since not all types of graphical symbols are suitable in all sorts of cultures.

A size of the area of the indicator may correspond to a size of the area of the zoomed in image of the scene. This is advantageous in that the person installing the surveillance camera can get an approximate idea about how large part of the zoomed out image will be included in the zoomed in image.

The indicator may display a part of the zoomed out image essentially corresponding to the zoomed in image of the scene. This is advantageous in that the person installing the surveillance camera can be provided with information about what parts of the scene will be present also in the zoomed in image.

The indicator may be semi-transparent. This is advantageous in that it is still possible to see the part of the scene in the zoomed out image that is under the indicator.

According to a second aspect, a mobile unit is used for facilitating installation of a surveillance camera for monitoring an object of interest in a scene. The mobile unit comprises a display. The mobile unit is arranged to: retrieve a zoomed out image of the scene acquired by the surveillance camera, wherein the zoomed out image has a zoomed out center point, overlay an indicator on the zoomed out image, wherein a center of the indicator and the zoomed out center point are displaced in relation to each other by a deviation, display the zoomed out image and the overlaid indicator in the display, the indicator indicating the position of a zoomed in image of the scene, thus enabling directing the surveillance camera so that the position of the object of interest and the indicator coincide so that the object of interest is included in a zoomed in image of the scene.

The second aspect can be embodied correspondingly to the first aspect. The advantages of the first aspect are equally applicable to the second aspect.

According to a third aspect, a surveillance camera monitors an object of interest in a scene. The surveillance camera is arranged to: acquire a zoomed out image of the scene having a zoomed out center point, overlay an indicator on the zoomed out image, wherein a center of the indicator and the zoomed out center point are displaced in relation to each other by a deviation, send the zoomed out image and the overlaid indicator to a display arranged to display the zoomed out image and the overlaid indicator, the indicator indicating the position of a zoomed in image of the scene, thus facilitating installation by enabling directing the surveillance camera so that the position of the object of interest and the indicator coincide so that the object of interest is included in a zoomed in image of the scene.

The third aspect can be embodied correspondingly to the first aspect. The advantages of the first aspect are equally applicable to the third aspect.

According to a fourth aspect, a system facilitates installation of a surveillance camera for monitoring an object of interest in a scene. The system comprises:

the surveillance camera being arranged to acquire a zoomed out image of the scene, a mobile unit being arranged to display, in a display, the zoomed out image wherein the zoomed out image has a zoomed out center point, the mobile unit being arranged to display, in the display, an indicator overlaid on the displayed zoomed out image, wherein a center of the indicator and the zoomed out center point are displaced in relation to each other by a deviation, the indicator indicating the position of a zoomed in image of the scene, thus enabling directing the surveillance camera so that the position of the object of interest and the indicator coincide so that the object of interest is included in a zoomed in image of the scene.

The fourth aspect can be embodied correspondingly to the first aspect. The advantages of the second aspect are equally applicable to the fourth aspect.

According to a fifth aspect, a method for facilitates installation of a surveillance camera for monitoring an object of interest in a scene. The method comprises:

the surveillance camera acquiring a zoomed out image of the scene, creating a zoomed in image of the scene by:

retrieving a deviation from a memory of the camera, calculating a new center by applying the deviation to a center of the zoomed out image, cropping the zoomed out image so that the new center is arranged in the center of the cropped image, digitally zooming in on the cropped image, thereby creating the zoomed in image, displaying the zoomed in image in a display, thus enabling directing the surveillance camera so that the object of interest is included in the zoomed in image of the scene.

This is advantageous in that the installation of the surveillance camera is facilitated. The person performing the installation does not need to use the zoom of the camera to be sure that the camera is properly directed. This also results in that the installation of the surveillance camera is speeded up. It is particularly advantageous for surveillance cameras that are not panned nor tilted during use after installation.

The method may further include displaying the zoomed out image in the display, which allows the person performing the installation to see what is displayed when the camera is in the zoomed out view when, e.g., redirecting the camera.

The deviation may be stored in a non-volatile memory in the surveillance camera. This is advantageous since the deviation can be measured during assembly (or later) and then be stored in the camera instead of storing the deviation in an external database which is much more cumbersome.

According to a sixth aspect, a mobile unit facilitates installation of a surveillance camera for monitoring an object of interest in a scene. The mobile unit comprises a display. The mobile unit is arranged to:

retrieve a zoomed out image of the scene acquired by the surveillance camera, create a zoomed in image of the scene by retrieving a deviation from a memory of the camera, calculating a new center by applying the deviation to a center of the zoomed out image, cropping the zoomed out image so that the new center is arranged in the center of the cropped image, and digitally zooming in on the cropped image, thereby creating the zoomed in image, display the zoomed in image in a display, thus enabling directing the surveillance camera so that the object of interest is included in the zoomed in image of the scene.

According to a seventh aspect, a surveillance camera monitors an object of interest in a scene. The surveillance camera is arranged to:

acquire a zoomed out image of the scene, create a zoomed in image of the scene by retrieving a deviation from a memory of the camera, calculating a new center by applying the deviation to a center of the zoomed out image, cropping the zoomed out image so that the new center is arranged in the center of the cropped image, and digitally zooming in on the cropped image, thereby creating the zoomed in image, send the zoomed in image to a display arranged to display the zoomed in image, thus enabling directing the surveillance camera so that the object of interest is included in the zoomed in image of the scene.

The sixth and seventh aspect can be embodied correspondingly to the fifth aspect. The advantages of the fifth aspect are equally applicable to the sixth and seventh aspect.

Other objectives, features and advantages will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION

The embodiments of the present invention will now be described more fully hereinafter with reference to the accompanying drawings. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

The embodiments facilitate installation of surveillance cameras that are not panned nor tilted during use after installation. Such surveillance cameras have a fixed direction during normal use. These surveillance cameras do not usually have motors for adjusting the pan/tilt angle. Instead, this is usually performed by hand by the person installing the surveillance camera. The surveillance camera may also have motorized panning and tilting that may be intended for use only during installation.

Figure 1A:
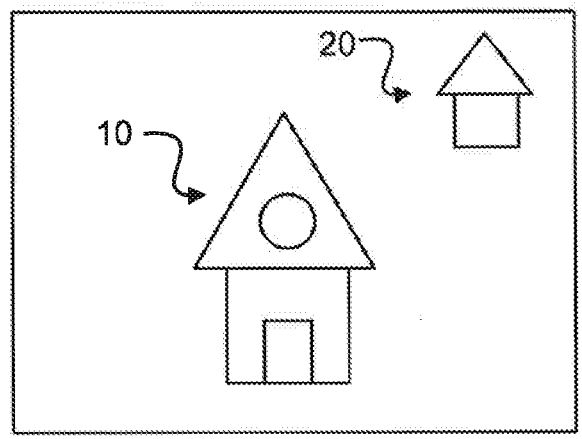
FIG. 1a is a camera view of a prior art camera.
Figure 1B:
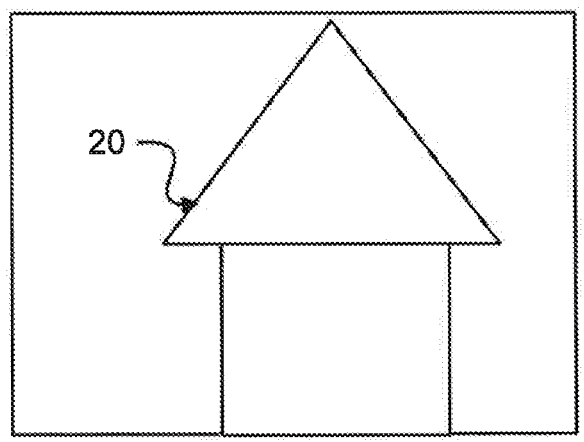
FIG. 1b is another camera view of the prior art camera of FIG. 1b.
Figure 2:
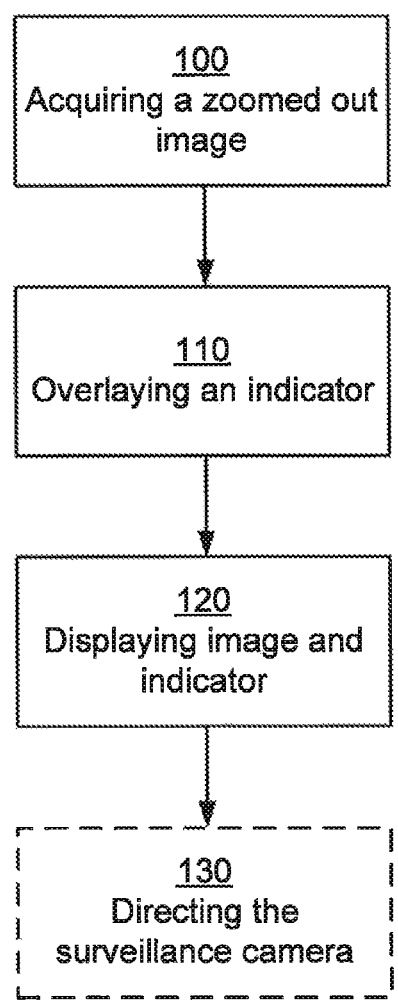
FIG. 2 is a schematic illustration of an embodiment of the inventive method.

FIG. 2 is a schematic illustration of an embodiment of the inventive method for facilitating installation of a surveillance camera for monitoring an object of interest in a scene.

In step 100, the surveillance camera acquires a zoomed out image of the scene. The zoomed out image has a zoomed out center point.

In step 110, an indicator is overlaid on the displayed zoomed out image. This step may be performed by, for example, a CPU (Central Processing Unit) arranged in, for example, the surveillance camera or a mobile unit.

In step 120, the zoomed out image and the overlaid indicator are displayed in a display. A center of the indicator and the zoomed out center point are displaced in relation to each other by a deviation. It is to be noted that step 110 and step 120 can be performed simultaneously. The indicator indicates the position of a zoomed in image of the scene.

Optionally, in step 130, the surveillance camera may be directed so that the position of the object of interest and the indicator coincide so that the object of interest is included in a zoomed in image of the scene.

Figure 3A:
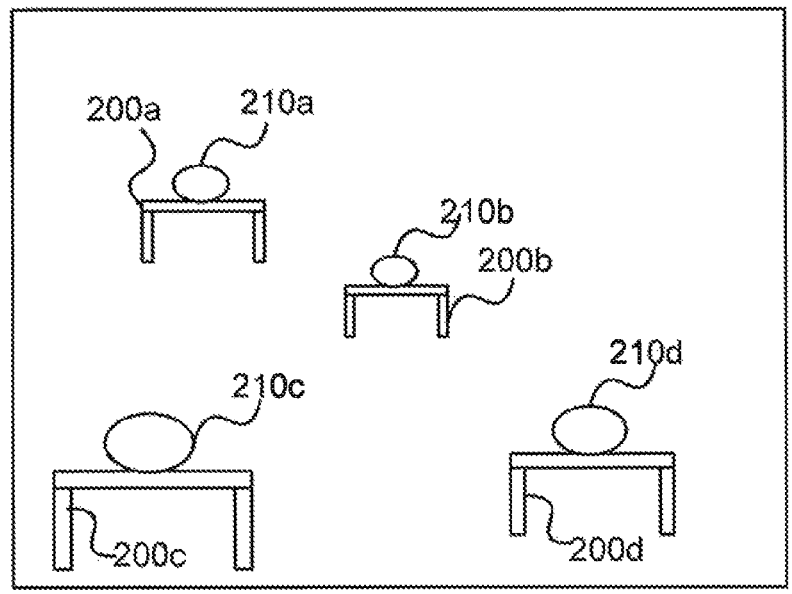
FIG. 3a is a schematic illustration of a zoomed out image of a scene.

A non-limiting example of the inventive method follows with reference to FIGS. 3a-3d. FIG. 3a depicts a zoomed out image acquired of an area containing a plurality of tables 200a-d. An object 210a-d is arranged on every table 200a-d. The area could, for example, be a room in a museum and the objects 210a-d could, for example, be valuable artifacts. If in this example, object 210b is the most valuable object, for monitoring purposes it could be desirable to both be able to acquire zoomed out images including the whole area and zoomed in images of object 210b. As can be seen from FIG. 3a, the zoomed out image is centered on the object 210b, since this is the most valuable object. Thus, it can be said that the zoomed out center point is on the object 210b.

Figure 3B:
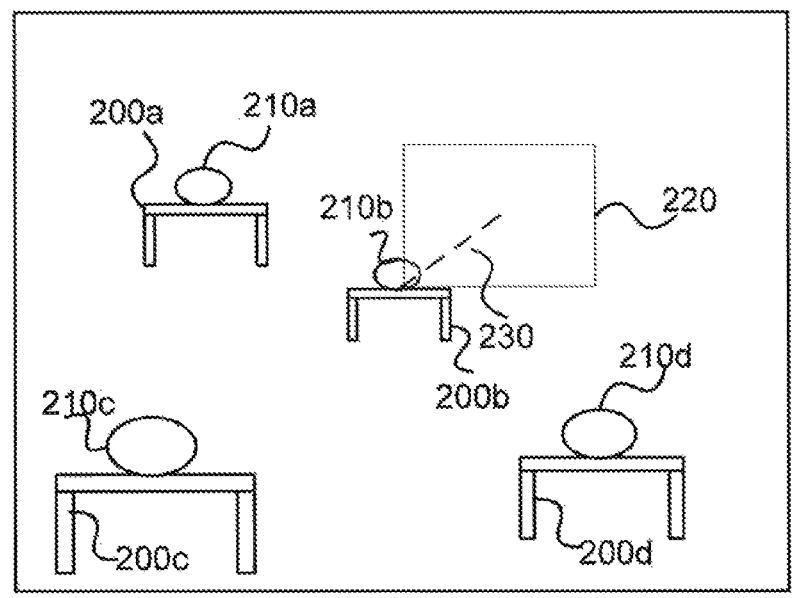
FIG. 3b is a schematic illustration of the zoomed out image of FIG. 3a with an indicator overlaid on the zoomed out image.
Figure 3C:
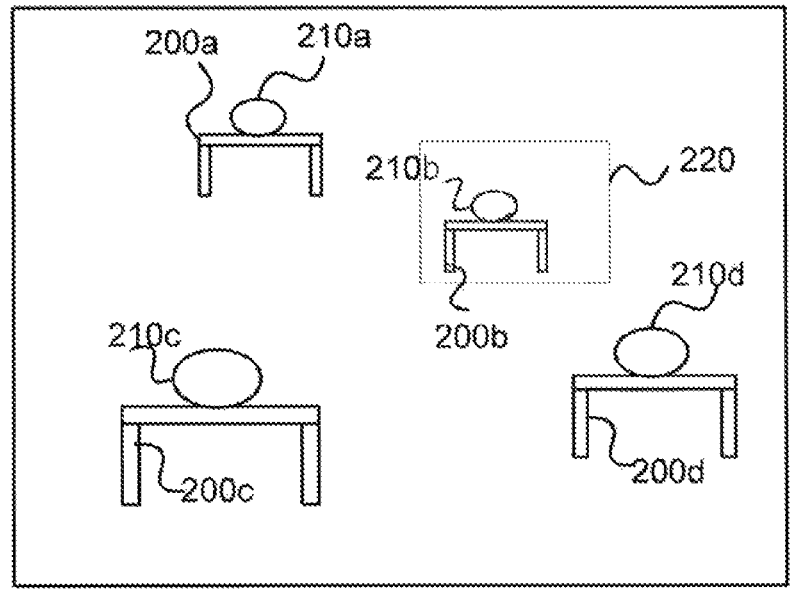
FIG. 3c is a schematic illustration of the zoomed out image of FIG. 3b acquired from a different angle.

FIG. 3b depicts the zoomed out image of FIG. 3a with an indicator 220 overlaid on the zoomed out image. In this particular embodiment, the indicator 220 is a semi-transparent rectangle. It is to be noted that the indicator may also be embodied as a dot, a point, a star, a cross, or a geometric shape such as a circle, ellipse, square, rectangle, triangle, or polygon, or a combination thereof. Such a combination could, for example, be a cross in the center of the indicator and small markings in the edges of the indicator (like edges in a rectangle for example).

Figure 3D:
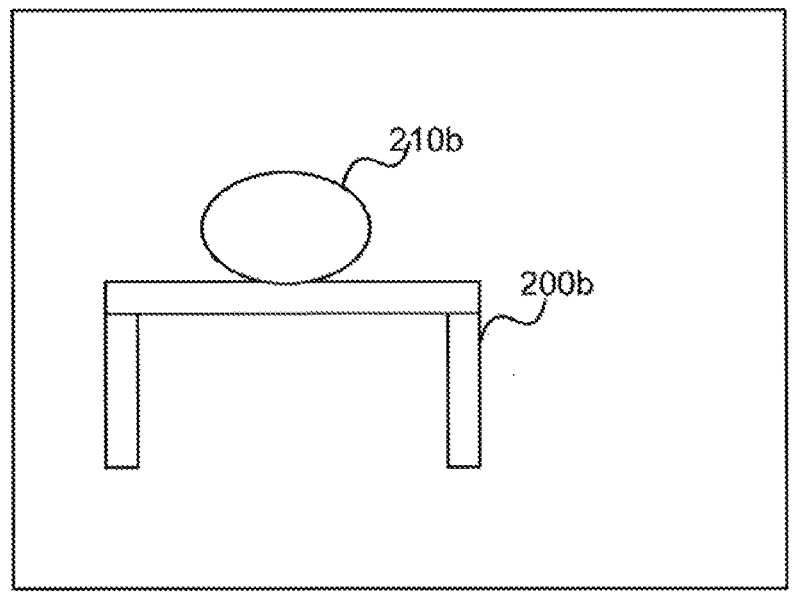
FIG. 3d is a schematic illustration of a zoomed in image of the scene of FIG. 3c.

From FIG. 3b, it can be seen that the zoomed out center point and the center of the indicator 220 are displaced in relation to each other by a deviation 230. It should be noted that the deviation 230 as shown, is included here for illustrative purposes, and may or may not be shown in the display as such. As the indicator 220 indicates the position and approximate area of a zoomed in image of the scene, it is clear that the zoomed in image will not include the object 210b or the entire table 200b. Therefore, the surveillance camera may be redirected so that the position of the object 210b and the indicator 220 coincide such that the object 210b and the table 200b are contained in the indicator 220, see FIG. 3c. This enables the object of interest to be included in a zoomed in image of the scene, as can be seen in FIG. 3d. It is to be noted that the step of zooming in which is illustrated in FIG. 3d is just included for illustrative purposes, and is not necessarily required.

Next, the deviation will be described more closely. It is to be noted that this applies to all aspects and embodiments of the invention. The deviation may for example be due to mechanical deviations in the surveillance camera. These mechanical deviations are measured and may be stored in a non-volatile memory of the surveillance camera. Different surveillance cameras can have different deviations. The deviations may, for example, be stored as pairs of X- and Y-coordinates. As an alternative, the deviations may for example be stored as pairs of lengths and angles. The deviation may be defined as the displacement between a zoomed out center point and a zoomed in center point. Upon measuring the deviations, the displacement between what is the center point when the camera is in a zoomed out position and what is the center point when the camera is in a zoomed in position, is measured. These deviations then provide information about how much the surveillance camera has to be redirected, i.e. panned and/or tilted, in order to compensate for the deviations.

The surveillance camera may have several zooming positions, between and including a maximally zoomed out position a maximally zoomed in position. Therefore, the deviations may be measured in a plurality of positions (e.g. at five positions) between and including a maximally zoomed out position and a maximally zoomed in position. If the surveillance camera is zoomed to a position not having an associated measured deviation, an associated deviation may be interpolated between the adjacent zooming positions having measured deviations. In some cameras, the deviations may be non-linear between a maximally zoomed out position and a maximally zoomed in position. Then, curve-fitting may be performed.

The zoomed in position need not be maximally zoomed in. Instead, the zoomed in position may be less than the maximally zoomed in position. Optionally, the zooming value of the zoomed in position may be set by the person installing the surveillance camera. This may, for example, be realized using a control display in the display.

The zoomed out position need not be maximally zoomed out. Instead, the zoomed out position may be less than the maximally zoomed out position. Optionally, the zooming value of the zoomed out position may be set by the person installing the surveillance camera. This may, for example, be realized using a control display in the display.

Figure 4:
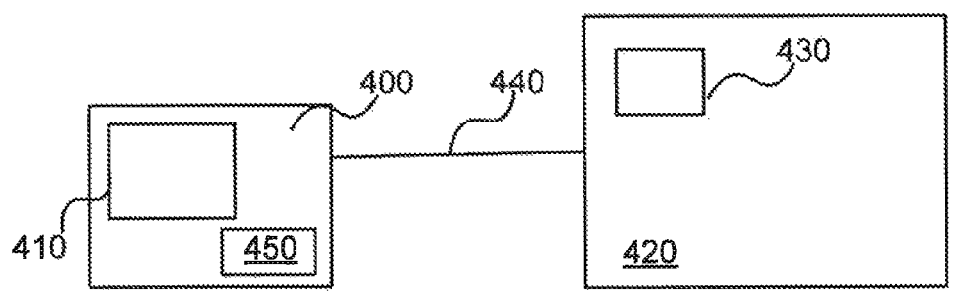
FIG. 4 is a schematic illustration of an embodiment of the inventive mobile unit.

FIG. 4 is a schematic illustration of an embodiment of an inventive mobile unit. The mobile unit 400 has a display 410 and a CPU (Central Processing Unit) 450. The mobile unit may be dedicated to only facilitating installation of a surveillance camera for monitoring an object of interest in a scene. Alternatively, the mobile unit may also incorporate other features. For example, the mobile unit may be any type of mobile unit such as, a PDA (Personal Digital Assistant), a palmtop computer, a mobile phone, a laptop computer, or a tablet computer.

The mobile unit 400 is used for facilitating installation of a surveillance camera 420 for monitoring an object of interest in a scene. During installation, the mobile unit 400 may be connected with the surveillance camera 430 using a network cable 440. The network cable 440 may be an Ethernet cable and the mobile unit 400 may be battery driven and power the surveillance camera using Power over Ethernet. Alternatively (and not shown), the mobile unit 400 may be a wireless mobile unit. The mobile unit 400 and the surveillance camera 430 may then be connected using, for example, a wireless network, Bluetooth, IR or similar. The surveillance camera has a non-volatile memory 430.

The memory 430 may be an EEPROM (Electrically Erasable Programmable Read-Only Memory) memory. The mobile unit 400 displays images acquired by the surveillance camera 420 in the display 410.

During installation, the CPU 450 retrieves a zoomed out image from the surveillance camera 420. The CPU 450 may overlay an indicator on the zoomed out image. The CPU 450 may display the zoomed out image and the overlaid indicator in the display 410. The center of the indicator and the center point of the zoomed out image may be displaced in relation to each other by a deviation. In order for the CPU 450 to be able to overlay the indicator on the zoomed out image, the CPU 450 may retrieve the deviation from the memory 430. The deviation may be retrieved from the memory 430 at the same time as the zoomed out images are retrieved. This embodiment enables directing the surveillance camera 420 so that the position of the object of interest and the indicator coincide so that the object of interest is included in a zoomed in image of the scene.

In another embodiment, the CPU 450 may retrieve a zoomed out image from the surveillance camera 420 and the CPU 450 may create a zoomed in image from the zoomed out image. The CPU 450 may retrieve a deviation from the memory 430, and may calculate a new center by applying the deviation to a center of the zoomed out image. The CPU 450 may crop the zoomed out image so that the new center is arranged in the center of the cropped image. The CPU 450 may digitally zoom in on the cropped image, thereby creating the zoomed in image. The CPU 450 may then display the zoomed in image in the display 410. Thus, installation is facilitated by enabling directing the surveillance camera 420 so that the object of interest is included in a zoomed in image of the scene. Optionally, the zoomed out image may also be displayed in the display 410.

Figure 5:
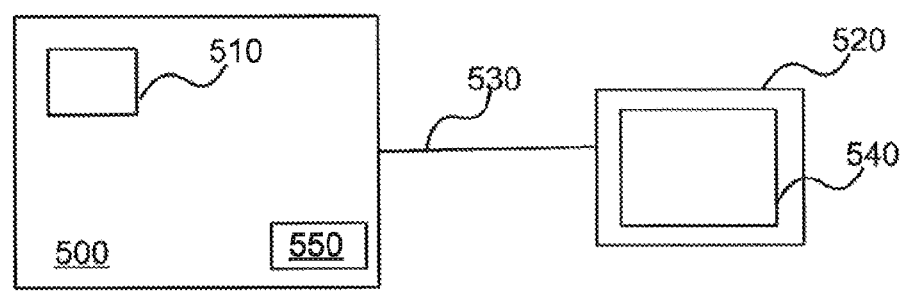
FIG. 5 is a schematic illustration of an embodiment of the inventive surveillance camera.

FIG. 5 is a schematic illustration of an embodiment of an inventive surveillance camera. The surveillance camera 500 may be a network camera having zooming capability, i.e., the surveillance camera 500 is able to optically zoom in and zoom out. The surveillance camera 500 may be directed towards an object of interest in a scene so that the object can be monitored.

The surveillance camera 500 has a non-volatile memory 510 and a CPU (Central Processing unit) 550. The memory 510 may be an EEPROM (Electrically Erasable Programmable Read-Only Memory) memory.

During installation of the surveillance camera 500, it may be connected to a mobile unit 520 using a network cable 530. The network cable 530 may be an Ethernet cable and the mobile unit 520 may be battery driven and power the surveillance camera using Power over Ethernet. Alternatively (and not shown), the mobile unit 520 may be a wireless mobile unit. The mobile unit 520 and the surveillance camera 500 are then connected using, for example, a wireless network, Bluetooth, IR or similar.

The surveillance camera 500 acquires a zoomed out image and the CPU 550 overlays an indicator on the zoomed out image. The center of the indicator and center point of the zoomed out image are displaced in relation to each other by a deviation. The deviation may be retrieved by the CPU 550 from the memory 510 in order to be able to overlay the indicator. The surveillance camera 500 may send the zoomed out image and the overlaid indicator to the mobile unit 520 which displays it in the display 540. Thus, installation is facilitated by enabling directing the surveillance camera 500 so that the position of the object of interest and the indicator coincide so that the object of interest is included in a zoomed in image of the scene.

In another embodiment, the surveillance camera 500 acquires a zoomed out image and the CPU 550 may create a zoomed in image from the zoomed out image. The CPU 550 may retrieve a deviation from the memory 510, and may calculate a new center by applying the deviation to a center of the zoomed out image. The CPU 550 may crop the zoomed out image so that the new center is arranged in the center of the cropped image. The CPU 550 may digitally zoom in on the cropped image, thereby creating the zoomed in image. The surveillance camera 500 may send the zoomed in image to the mobile unit 520 which displays it in the display 540. Thus, installation is facilitated by enabling directing the surveillance camera 500 so that the object of interest is included in a zoomed in image of the scene. Optionally, the zoomed out image may be sent to the mobile unit 520 and displayed in the display 540.

Next, the indicator will be described more closely. As indicated above, the indicator may be embodied as a dot, a point, a star, a cross, or a geometric shape such as a circle, ellipse, square, rectangle, triangle, or polygon. The indicator may have a color, such as, for example, red or green. Furthermore, the indicator can be semi-transparent. Also, the area of the indicator may correspond to the area of the zoomed in image of the scene. Additionally, the indicator may display a part of the zoomed out image essentially corresponding to the zoomed in image of the scene. In this embodiment, the displayed part of the zoomed out image may be zoomed in using digital zoom (e.g., a 4× zoom). This is advantageous since the person performing the installation will get a better sight of what will be seen in the zoomed in view if it is enlarged.

Surveillance cameras having variable zoom may slightly change their view angle when the focus is shifted. Therefore, in embodiments in which the area of the indicator corresponds to the area of the zoomed in image of the scene, the area of the indicator may correspond to the smallest possible area of the zoomed in image of the scene in terms of focus shift.

It is to be noted that all embodiments and features described in this application are applicable on all aspects of the invention.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A method for facilitating installation of a surveillance camera for monitoring an object of interest in a scene, comprising:
    the surveillance camera acquiring a zoomed out image of the scene, wherein the zoomed out image has a zoomed out center point;
    overlaying an indicator on the displayed zoomed out image, wherein a position of the indicator indicates the position of a zoomed in image of the scene and a center of the indicator corresponds to a center of a zoomed in image;
    displaying, in a display, the zoomed out image and the overlaid indicator, wherein the center of the indicator and the zoomed out center point are displaced in relation to each other by a deviation, wherein the deviation is due to mechanical deviations in the surveillance camera; and
    wherein the position of the indicator enables fixedly setting the direction of the surveillance camera using the position of the displayed indicator so that the position of the object of interest and the indicator coincide so that the object of interest is included in the zoomed in image of the scene, wherein the surveillance camera is in a fixed direction during use after installation.

2. The method according to claim 1, wherein the deviation is stored in a non-volatile memory in the surveillance camera.

3. The method according to claim 1, wherein the indicator is at least one from a dot, a point, a star, a cross, a geometric shape, circle, ellipse, square, rectangle, triangle, a polygon, or a combination thereof.

4. The method according to claim 1, wherein a size of the area of the indicator corresponds to a size of the area of the zoomed in image of the scene.

5. The method according to claim 1, wherein the indicator displays a part of the zoomed out image essentially corresponding to the zoomed in image of the scene.

6. The method according to claim 1, wherein the indicator is semi-transparent.

7. A mobile unit for facilitating installation of a surveillance camera for monitoring an object of interest in a scene, comprising a display, the mobile unit arranged to:
    retrieve a zoomed out image of the scene acquired by the surveillance camera, wherein the zoomed out image has a zoomed out center point;
    overlay an indicator on the zoomed out image, wherein a center of the indicator and the zoomed out center point are displaced in relation to each other by a deviation, wherein the center of the indicator corresponds to a center of a zoomed in image and the deviation is due to mechanical deviations in the surveillance camera; and
    display the zoomed out image and the overlaid indicator in the display, wherein the indicator indicates the position of a zoomed in image of the scene,
    wherein the position enables fixedly setting the direction of the surveillance camera using the position of the displayed indicator so that the position of the object of interest and the indicator coincide so that the object of interest is included in the zoomed in image of the scene, wherein the surveillance camera is in a fixed direction during use after installation.

8. The mobile unit according to claim 7, wherein the deviation is stored in a non-volatile memory in the surveillance camera.

9. The mobile unit according to claim 7, wherein the indicator is at least one from a dot, a point, a star, a cross, a geometric shape, circle, ellipse, square, rectangle, triangle, a polygon, or a combination thereof.

10. The mobile unit according to claim 7, wherein a size of the area of the indicator corresponds to a size of the area of the zoomed in image of the scene.

11. The mobile unit according to claim 7, wherein the indicator is arranged to display a part of the zoomed out image essentially corresponding to the zoomed in image of the scene.

12. The mobile unit according to claim 7, wherein the indicator is semi-transparent.

13. A surveillance camera for monitoring an object of interest in a scene, the surveillance camera being arranged to
    acquire a zoomed out image of the scene having a zoomed out center point;
    overlay an indicator on the zoomed out image, wherein a center of the indicator and the zoomed out center point are displaced in relation to each other by a deviation, wherein the center of the indicator corresponds to a center of a zoomed in image and the deviation is due to mechanical deviations in the surveillance camera; and
    send the zoomed out image and the overlaid indicator to a display arranged to display the zoomed out image and the overlaid indicator, wherein the indicator indicates the position of a zoomed in image of the scene,
    wherein the position enables fixedly setting the direction of the surveillance camera using the position of the displayed indicator so that the position of the object of interest and the indicator coincide so that the object of interest is included in a zoomed in image of the scene, wherein the surveillance camera is in a fixed direction during use after installation.

14. The surveillance camera according to claim 13, wherein the deviation is stored in a non-volatile memory in the surveillance camera.

15. The surveillance camera according to claim 13, wherein the indicator is at least one from a dot, a point, a star, a cross, a geometric shape, circle, ellipse, square, rectangle, triangle, a polygon, or a combination thereof.

16. The surveillance camera according to claim 13, wherein a size of the area of the indicator corresponds to a size of the area of the zoomed in image of the scene.

17. The surveillance camera according to claim 13, wherein the indicator is arranged to display a part of the zoomed out image essentially corresponding to the zoomed in image of the scene.

18. The surveillance camera according to claim 13, wherein the indicator is semi-transparent.

19. The method according to claim 1, further comprising:
  displaying the deviation to show size and direction of the deviation; and
  fixedly setting the direction of the surveillance camera using the deviation so that the position of the object of interest and the indicator coincide so that the object of interest is included in the zoomed in image of the scene.

20. The mobile unit according to claim 7, further comprising:
  display the deviation to show size and direction of the deviation; and
  fixedly set the direction of the surveillance camera using the deviation so that the position of the object of interest and the indicator coincide so that the object of interest is included in the zoomed in image of the scene.

* * * * *